United States Patent
Luquire

(10) Patent No.: US 6,415,634 B2
(45) Date of Patent: *Jul. 9, 2002

(54) PADLOCK

(76) Inventor: L. Hanson Luquire, 1742 Radcliffe Rd., Montgomery, AL (US) 36106

( * ) Notice: Subject to any disclaimer, the term of this patent is extended or adjusted under 35 U.S.C. 154(b) by 0 days.

This patent is subject to a terminal disclaimer.

(21) Appl. No.: 09/789,135

(22) Filed: Feb. 20, 2001

Related U.S. Application Data

(63) Continuation of application No. 09/266,427, filed on Mar. 11, 1999, now Pat. No. 6,227,015.

(51) Int. Cl.[7] ............................ E05B 37/02; E05B 73/00
(52) U.S. Cl. ........................ 70/18; 24/598.1; 70/22; 70/23; 70/28; 70/29; 70/53
(58) Field of Search ............................... 70/22, 23, 28, 70/18, 20, 27, 29, 43, 53; 24/598.1, 599.3, 600.9

(56) References Cited

U.S. PATENT DOCUMENTS

| | | | | |
|---|---|---|---|---|
| 93,501 A | * | 8/1869 | Treat | |
| 226,069 A | * | 3/1880 | Hathaway | |
| 596,187 A | * | 12/1897 | Stephens | 70/22 |
| 903,680 A | * | 11/1908 | Cowie | |
| 978,706 A | * | 12/1910 | Ranyak | 70/22 |
| 1,092,031 A | * | 3/1914 | En Earl | |
| 1,205,781 A | * | 11/1916 | Pirog | 70/28 |
| 1,257,013 A | * | 2/1918 | Nielsen | |
| 1,394,219 A | * | 10/1921 | Raddick | 70/18 |
| 1,499,960 A | * | 7/1924 | Almedia | 70/18 |
| 1,507,213 A | * | 9/1924 | Singer et al. | |
| 1,542,016 A | * | 6/1925 | Stull | 70/24 |
| 1,550,128 A | * | 8/1925 | Verwer | |
| 3,747,376 A | * | 7/1973 | White, Jr. | 70/18 |
| 3,748,876 A | * | 7/1973 | Mathews | 70/18 |
| 3,908,414 A | * | 9/1975 | Thorne | 70/18 |
| 3,959,995 A | * | 6/1976 | Fletcher | 70/18 |
| 3,991,594 A | * | 11/1976 | Goenner | 70/30 |
| 4,047,406 A | * | 9/1977 | Foote | 70/25 |
| 4,494,391 A | * | 1/1985 | Solow | 70/18 X |
| 4,682,481 A | * | 7/1987 | Dimmick et al. | 70/22 X |
| 4,760,718 A | * | 8/1988 | Muramatsu et al. | 70/49 X |
| 4,805,426 A | * | 2/1989 | Dimmick et al. | 70/22 X |
| 4,823,568 A | * | 4/1989 | Rogers et al. | 70/58 |
| 4,860,561 A | * | 8/1989 | Hwang | 70/28 |
| 4,956,982 A | * | 9/1990 | Valley | 70/18 X |
| 5,042,277 A | * | 8/1991 | Tenu-Rong | 70/28 |
| 5,325,689 A | * | 7/1994 | Warner | 70/18 X |
| 5,433,092 A | * | 7/1995 | Kuo | 70/46 |
| 5,463,798 A | * | 11/1995 | Wurzer | 24/599.5 |
| 5,472,101 A | * | 12/1995 | Ahrens | 70/58 X |
| 5,475,993 A | * | 12/1995 | Kuo | 70/18 |
| 5,685,179 A | * | 11/1997 | Yong | 70/28 |
| 5,765,409 A | * | 6/1998 | Yong | 70/28 |
| 5,782,113 A | * | 7/1998 | Chen | 70/28 |
| 5,901,587 A | * | 5/1999 | Chen | 70/28 |
| 6,227,015 B1 | * | 5/2001 | Luquire | 70/18 |

FOREIGN PATENT DOCUMENTS

| | | | | |
|---|---|---|---|---|
| CH | 88883 | * | 4/1921 | 70/20 |
| DE | 79653 | * | 2/1895 | 70/22 |
| DE | 335862 | * | 4/1921 | 70/18 |
| DE | 384610 | * | 11/1923 | 70/22 |
| DE | 1008599 | * | 5/1957 | 70/53 |
| DE | 4237263 | | 7/1994 | |
| FR | 877523 | * | 12/1942 | 70/43 |
| FR | 889891 | * | 1/1944 | 70/28 |
| FR | 2146704 | | 3/1973 | |
| GB | 19601 | * | 9/1896 | 70/28 |
| GB | 11066 | * | 5/1903 | 70/20 |

OTHER PUBLICATIONS

Photocopies of a Master Lock "Backpack Lock" and of its packaging, whose reverse bears a 1998 copyright notation.

* cited by examiner

*Primary Examiner*—Lloyd A. Gall
(74) *Attorney, Agent, or Firm*—Dean W. Russell; Kilpatrick Stockton LLP

(57) ABSTRACT

Padlocks adapted for one-handed operation are disclosed. Typically having a laterally asymmetric shackle, the lock includes an arm connected thereto so as to pivot when the locking mechanism is disengaged. A spring or other component facilitates latching of the device by biasing the arm toward an exposed end of the shackle.

4 Claims, 2 Drawing Sheets

PADLOCK

This application claims priority to and is a continuation of U.S. patent application Ser. No. 09/266,427 (now U.S. Pat. No. 6,227,015), filed Mar. 11, 1999, entitled "Padlock."

FIELD OF THE INVENTION

This invention relates to locks for securing objects and more particularly to padlocks typically having an elongated, laterally asymmetric shackle and adapted for one-handed use.

BACKGROUND OF THE INVENTION

U.S. Pat. No. 1,542,016 to Stull, incorporated herein in its entirety by this reference, discloses a "permutation" lock with an essentially symmetric, "substantially C-shaped" shackle. Also included as part of the permutation lock are a sleeve surrounded by an "operating barrel," manipulation of which will move the sleeve. Properly turning the barrel, therefore, allows both it and the sleeve to "be bodily moved back upon the shackle" and open the locking mechanism.

U.S. Pat. No. 5,433,092 to Kuo likewise discloses a keyed lock with a symmetric shackling system. Formed of two rods (rather than the one of the device of the Stull patent), the lock of the Kuo patent contemplates connecting the rods with a pin or bolt remote from the housing containing the locking mechanism. Normal use of the lock almost certainly requires two hands, one to use the key to manipulate the mechanism and the other to grasp and move at least one of the two rods.

SUMMARY OF THE INVENTION

The present invention, by contrast, provides a padlock having, in many embodiments, a laterally asymmetric shackle. Adapted for one-handed operation, the lock additionally includes an arm connected adjacent one end of the shackle by a pin or equivalent component. In use, the arm is capable of pivoting about the pin following exposure of the opposite end of the shackle.

Surrounding a portion of the arm is a cylindrical (or other) shaped sleeve. Although conceivably useful in connection with a keyed (or other) mechanism, the sleeve preferably circumscribes and includes one or more tumblers of a combination locking mechanism. When appropriately rotated, as with a thumb or finger of one hand, the one or more tumblers allow the sleeve to slide along the arm toward the pivot pin, thereby exposing the opposite end of the shackle and permitting the arm to pivot away therefrom. A spring or other component facilitates latching of the device by biasing the arm toward the exposed shackle end.

The shackle of the present padlock defines at least two curved (generally but not necessarily U-shaped) sections, one having a greater radius than the other. By designing the shackle asymmetrically, the padlock is especially useful in certain locations, inclining the cylindrical sleeve in a manner facilitating its movement. In other locations the limited width of the smaller curved section requires the object to be protected to circumscribe a portion of the larger curved section of the shackle, ensuring that the arm will pivot away from the object when the lock is opened. The shackle additionally is aesthetically attractive, as the precise shapes and relative placement of its curved and straight segments, for example, are not necessarily critical to its operation.

Indeed, some embodiments of the padlock of the invention resemble in appearance either a human ear or carabiners used in alpine sports activities such as mountain climbing. U.S. Pat. No. 5,463,798 to Wurzer discusses, in a section entitled "Description of the Related Art," aspects of conventional carabiners. As detailed at column 1, lines 52–60 of the Wurzer patent, these carabiners require, among other things, two-handed actuation and obviously are not intended to be opened using a key or tumblers. Both their function and operation, therefore, differ from those of the padlocks of the present invention.

It is thus an object of the present invention to provide a padlock adapted for one-handed operation.

It is also an object of the present invention to provide a padlock having a laterally asymmetric shackle.

It is another object of the present invention to provide a lock in which the shackle defines at least two curved sections, one of which is wider, or has a greater radius of curvature, than the other.

It is a further object of the present invention to provide a lock in which an arm is attached to the shackle proximate the narrower curved section.

It is an additional object of the present invention to provide a lock having one or more tumblers circumscribing portions of the arm and adapted to rotate when manually manipulated by a thumb or finger.

It is yet another object of the present invention to provide a lock in which a spring or other component biases an arm toward a locked or latched position.

Other objects, features, and advantages of the present invention will become apparent with reference to the remainder of the text and the drawings of this application.

DETAILED DESCRIPTION

Figure 1:
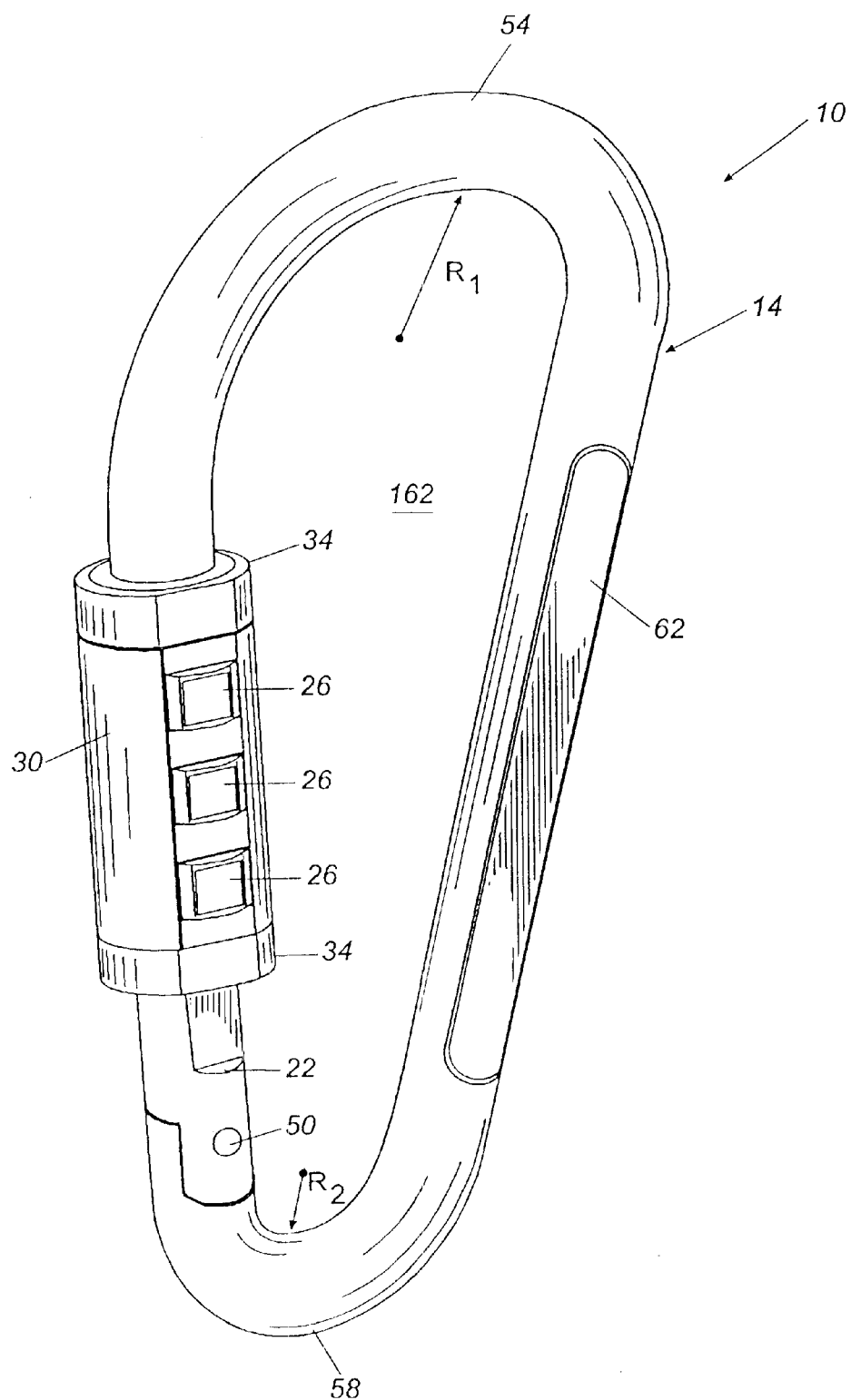
FIG. 1 is a perspective view of an exemplary padlock of the present invention.
Figure 2:
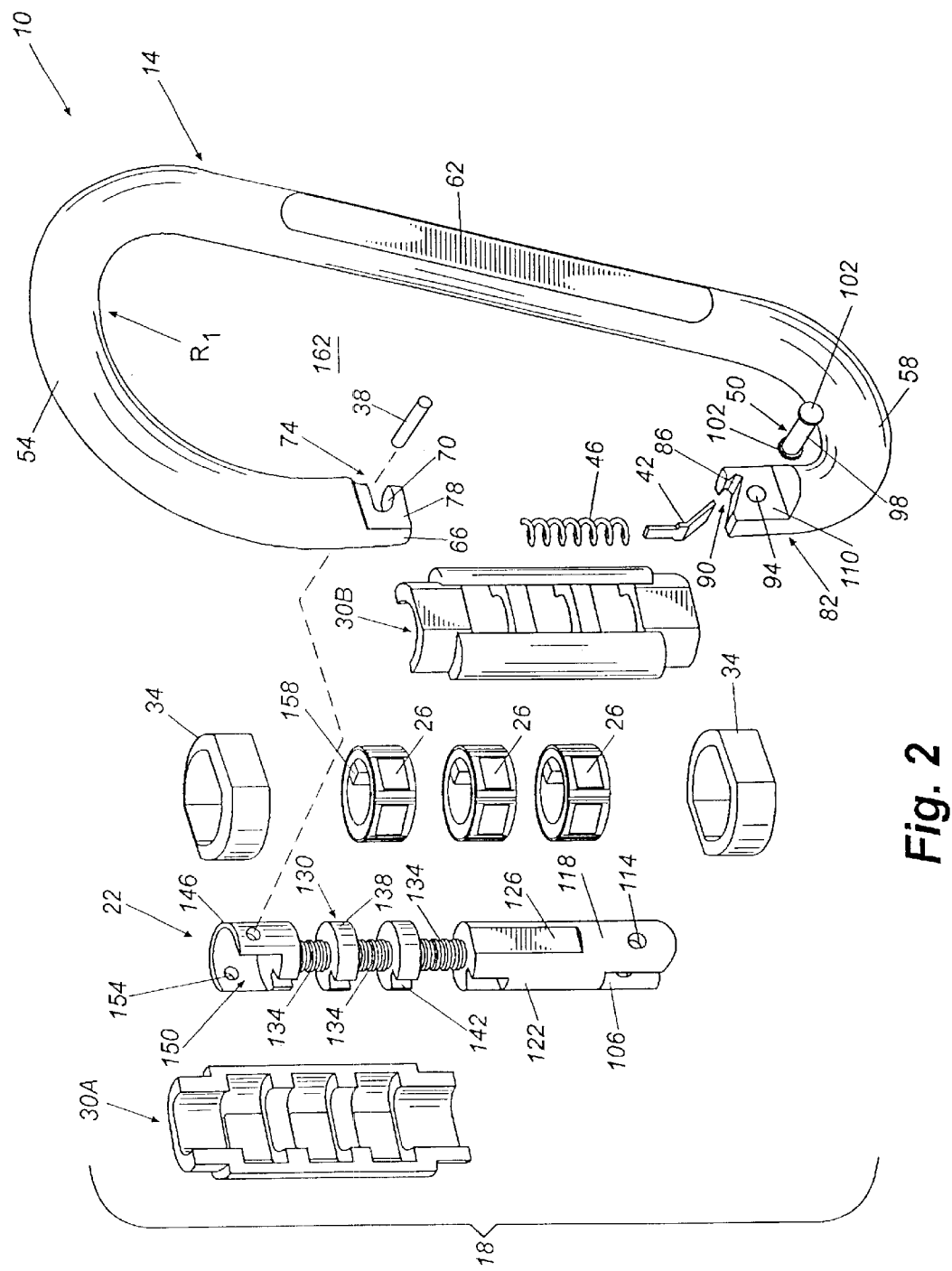
FIG. 2 is an exploded view of the padlock of FIG. 1.

FIGS. 1–2 illustrated a version of padlock 10 of the present invention. Included as part of typically oblong-shaped padlock 10 are shackle 14 and locking mechanism 18, some or all of which may be made of plastic, metal, or any other appropriate material. As shown principally in FIG. 2, mechanism 18 may include each of arm 22, tumblers 26, sleeve 30 (formed of segments 30A and 30B), collars 34, stop 38, blade 42, and spring 46. Also detailed in FIGS. 1–2 is pin 50, which in use connects arm 22 to shackle 14.

An exemplary shackle 14 incorporates curved sections 54 and 58 separated by section 62. The radius of curvature of section 54 typically is greater than that of section 58, so that shackle 14 is not symmetric laterally. By contrast, section 62 usually is straight (or relatively so), so that the appearance of padlock 10 resembles a human ear or carabiner. Padlock 10 need not necessarily be oblong, however, but rather may assume other desired shapes. In some embodiments of lock 10, furthermore, shackle 14 need not be laterally asymmetric.

Formed at end 66 of section 54 is recess 70, whose mouth 74 faces section 62. As described later in this application, recess 70 is adapted to receive stop 38 of locking mechanism 18. Additionally optionally incorporated into end 66 are flat regions 78.

Opposed end 82 is present as part of section 58 of shackle 14. Formed at end 82 is recess 86 having mouth 90. Unlike mouth 74, however, mouth 90 faces end 66 rather than section 62. In use, recess 86 receives blade 42, which assists in the bias of arm 22 by spring 46.

Also formed at end 82 of section 58 is aperture 94. Extending the depth (diameter) of shackle 14, aperture 94 is designed to receive shaft 98 of pin 50, and consequently has a diameter approximately the same as (although slightly larger than) that of shaft 98. Expanded-diameter heads 102 of pin 50 retain the pin 50 in position once inserted through aperture 94.

As illustrated in FIGS. 1–2, the radius of curvature $R_1$ of section 54 is greater than radius $R_2$ of section 58. Accordingly, shackle 14 lacks symmetry laterally. Certain hasps, staples, or other objects to be fastened by lock 10, furthermore, are sufficiently large compared to radius $R_2$ so that section 58 cannot readily slide through them. As a consequence, lock 10 frequently is oriented with section 54 upward, resting in contact with the object to be protected, and section 58 depending therefrom. This likewise permits sleeve 30 to slide downward when lock 10 is opened, in the direction of gravitational force. In other situations, the asymmetry of shackle 14 may incline sleeve 30 toward a user, facilitating manual manipulation of tumblers 26.

Arm 22 of mechanism 18 is multiply sectioned. Lower section 106 of arm 22 is hollow for an extended depth, so that spring 46 and blade 42 may be received therein and it may be fitted over (flat surfaces 110 of) end 82. Incorporated additionally in lower section 106 are openings 114. If fitted appropriately over end 82, lower section 106 will have openings 114 aligned with and surrounding aperture 94. Once so fitted, openings 114 and aperture 94 may receive pin 50, with heads 102 (whose diameter exceeds that of openings 114) fixing the relative placement of the lower section 106 and end 82. Pin 50 thus functions not only as a retainer, but also as an axis about which arm 22 may pivot.

Preferably, interior portions of lower section 106 adjacent openings 114 are flat so as to abut flat surfaces 110 of end 82. However, those skilled in the art will recognize that such portions need not necessarily be flat, nor need be surfaces 110. Likewise, pivot mechanisms other than pin 50 may be employed as appropriate or desired in connection with the invention. Nevertheless, FIGS. 1–2 illustrate a version of lock 10 suitable for many purposes.

Exterior 118 of lower section 106 may include an elongated notched region 122 and flat surfaces 126. As detailed hereafter, the existence of region 122 permits sleeve 30 to slide along arm 22 toward end 82 of shackle 14. Surfaces 126 similarly assist this sliding, as well as inhibiting sleeve 30 from rotating about the arm 22.

Middle section 130 of arm 22 contains one or more segments 134 of reduced diameter. Each such segment 134 present in arm 22 is circumscribed by a tumbler 26, and if the segments 134 number more than one, is spaced from an adjacent segment 134 by an island 138. Each island 138 includes a notched region 142 which is aligned longitudinally with notched region 122 of lower section 106.

Upper section 146 of arm 22 has a generally U-shaped (or other) interior 150 designed to mate with, or engage, flat regions 78 of end 66 (or, alternatively, simply abut end 66). Additionally incorporated in upper section 146 are openings 154 into which stop 38 is inserted. As inserted, therefore, stop 38 spans interior 150, and as arm 22 is pivoted toward end 66, stop 38 is received by mouth 74 into recess 70 but prevents further movement thereof.

Sleeve 30 may, as noted earlier, be formed of segments 30A and 30B. If so, collars 34 may be fitted about the segments 30A and 30B to retain them as unitary sleeve 30. Sleeve 30 additionally houses tumblers 26 positioned about arm 22.

Each tumbler 26 may have an interior protrusion 158 corresponding to a numeral or other symbol present on its face. Such protrusion 158 additionally is adapted to be received by notched regions 142 and 122. Thus, when each tumbler 26 is manipulated so as to align protrusions 158 with notched regions 142, sleeve 30 can slide along arm 22 toward end 82. Doing so exposes end 66 of shackle 14, permitting arm 22 to be pivoted by manual pressure inward toward section 62 (into interior space 162) and thereby "open" lock 10.

Because blade 42 is oriented as shown in FIG. 2, pivoting arm 22 inward opposes the force of spring 46. The blade 42 and spring 46 thus bias upper section 146 of arm 22 outward toward end 66, attempting to return stop 38 into recess 70. This bias facilitates "closing" lock 10 when manual pressure on arm 22 is released, as the user need merely allow the arm 22 to return to its biased position and then slide sleeve 30 upward and rotate tumblers 26 so that at least one protrusion 158 no longer is aligned with a corresponding notched region 142. One-handed operation of lock 10 is thus a viable aspect of the present invention, although two-handed operation may occur as well.

The foregoing is provided for purposes of illustrating, explaining, and describing embodiments of the present invention. Further modifications and adaptations to these embodiments will be apparent to those skilled in the art and may be made without departing from the scope of spirit of the invention. Locking mechanism 18 need not necessarily be as expressly described above, for example, and may have more or fewer components. It likewise may be keyed or otherwise adapted to be opened and closed without use of tumblers 26. As further examples, biasing devices other than blade 42 and spring 46 could alternatively be used, as could retainers other than pin 50 and stop 38.

I claim:

1. A padlock, which when in a closed position bounds an interior space, the padlock comprising:
   a. a shackle having spaced first and second ends;
   b. an arm extending approximately the distance between the first and second ends and connected to the second end, the arm capable of being pivoted into the interior space;
   c. a sleeve positioned about at least part of the arm; and
   d. a plurality of manually-manipulatable tumblers housed by the sleeve.

2. A padlock according to claim 1 in which the sleeve is slidable along the arm.

3. A padlock according to claim 1 further comprising a pin connecting the arm to the second end.

4. A padlock according to claim 2 further comprising a pin connecting the arm to the second end.

* * * * *